United States Patent
Klein

[15] 3,640,854
[45] Feb. 8, 1972

[54] CONTINUOUS FORMING OF METAL OXIDES

[72] Inventor: Gerhart P. Klein, Manchester, Mass.

[73] Assignee: P. R. Mallory & Co., Inc., Indianapolis, Ind.

[22] Filed: Dec. 10, 1969

[21] Appl. No.: 883,887

[52] U.S. Cl. ..............................204/28, 204/27, 204/202, 204/206
[51] Int. Cl. .........................................C23b 9/00, B01k 3/00
[58] Field of Search ..............................204/28, 56, 56 R, 27

[56] References Cited

UNITED STATES PATENTS

| | | | |
|---|---|---|---|
| 3,563,863 | 2/1971 | Vievow | 204/56 R |
| 2,692,851 | 10/1954 | Burrows | 204/58 |
| 2,897,125 | 7/1959 | Franklin | 204/58 |
| 2,965,551 | 12/1960 | Richard | 204/32 |
| 3,020,219 | 2/1962 | Franklin et al. | 204/58 |
| 3,398,067 | 8/1968 | Raffalovich | 204/42 |
| 3,510,410 | 5/1970 | Rosenthal et al. | 204/28 |
| 3,466,230 | 9/1969 | Carithers | 204/42 X |

Primary Examiner—F. C. Edmundson
Attorney—Richard H. Childress, Robert F. Meyer, Henry W. Cummings and C. Carter Ells, Jr.

[57] ABSTRACT

A method is disclosed for the continuous forming of metal oxides, for example, film forming (i.e. tantalum) strip, by passing the metal through electrolyte jets in contact with counterelectrodes which provide for stepwise increases in the formation voltage.

9 Claims, 6 Drawing Figures

CURRENT-VOLTAGE CHARACTERISTICS

CURRENT-VOLTAGE CHARACTERISTICS

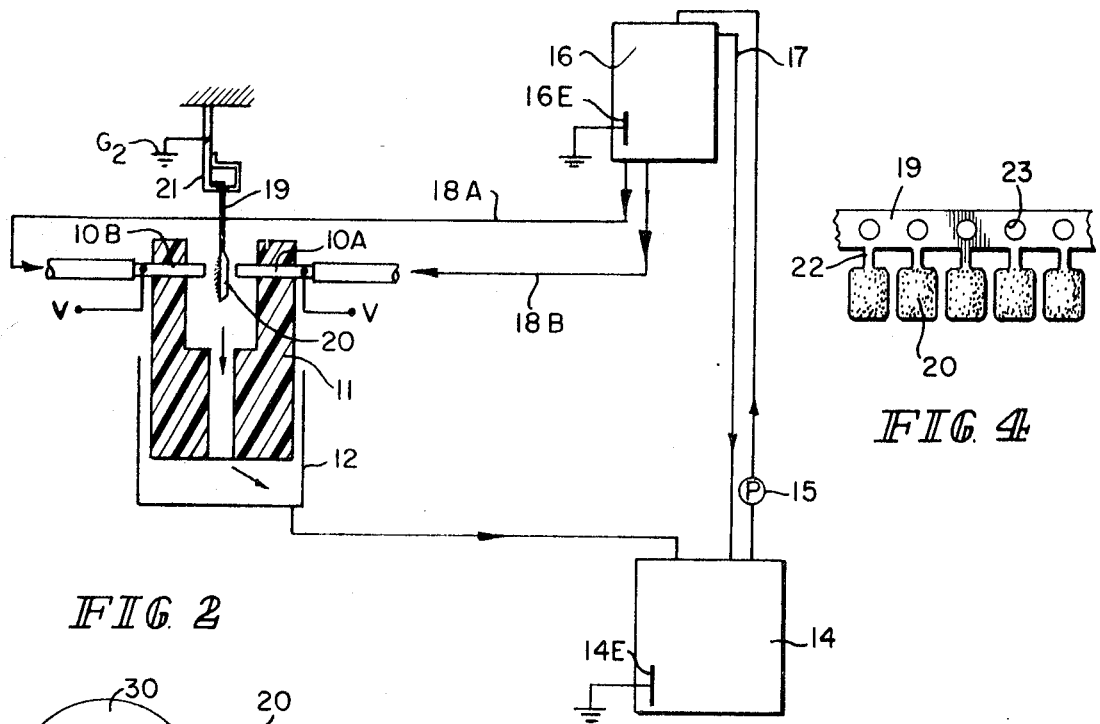
FIG. 2
FIG. 4
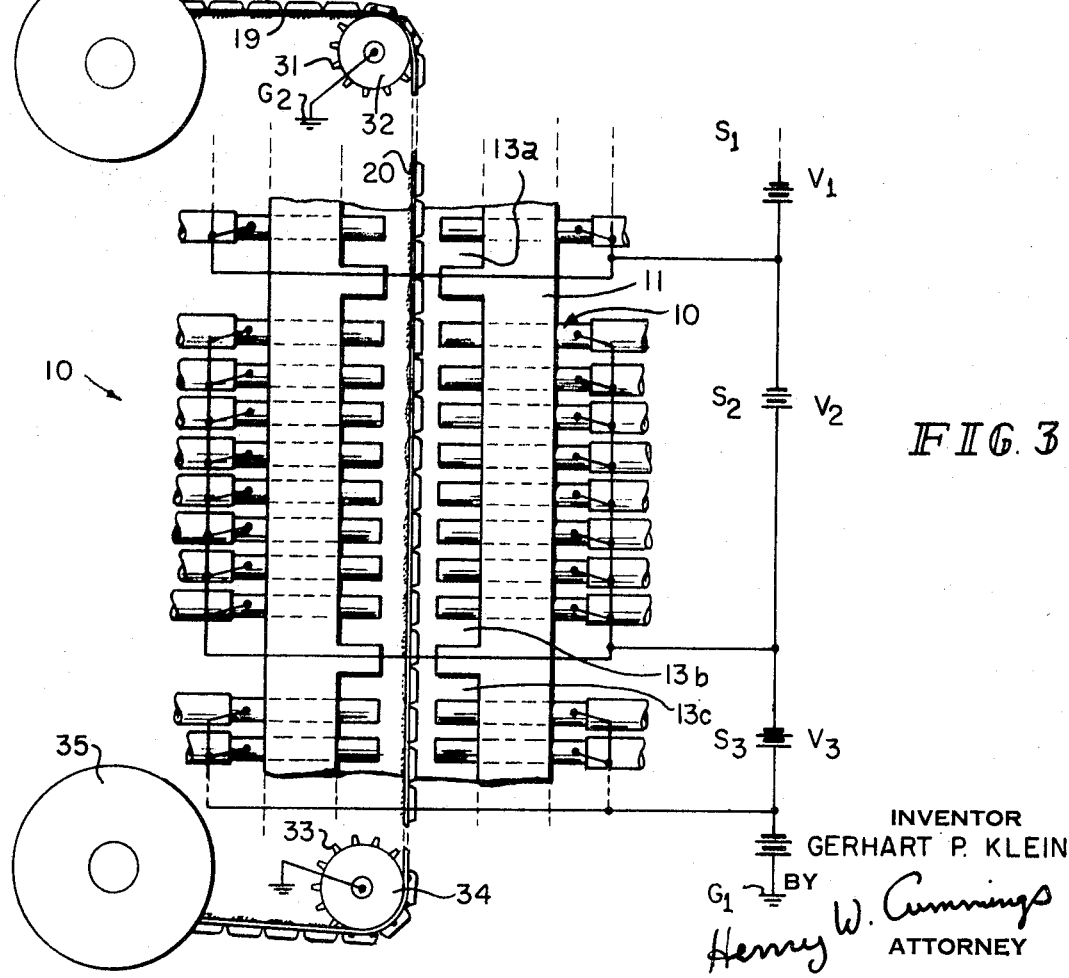
FIG. 3
INVENTOR
GERHART P. KLEIN
BY
Henry W. Cummings
ATTORNEY

CONTINUOUS FORMING OF METAL OXIDES

BACKGROUND OF THE INVENTION

In a process of anodic oxidation of a metal, for instance, tantalum, an oxide film is generated on the surface of the tantalum by immersing in an electrolyte, typically dilute phosphoric acid, and applying a potential between the tantalum and a counterelectrode in the same electrolyte environment. The temperature of the electrolyte is generally above room temperature, for example, about 85° C.

The interrelationship of the variables of the anodic oxidation of tantalum is rather complex. The major factors that affect oxide formation in tantalum anodes are:
current density
electrolyte concentration
temperature
anode size and geometry
anode porosity
chemical purity of tantalum.

The formation of oxide under the driving force of an electrical potential consumes electrical charge, the amount of which is generally proportional to the thickness of the oxide film. The rate at which the thickness of the oxide increases is generally proportional to the current density, which in a porous system, such as a sintered tantalum anode, is best expressed in terms of current per gram, or current per CV (amp/$\mu$f.-v.). Therefore, control of the rate of oxide formation usually means control of the current density. Thus one problem in continuous formation involves controlling the current density.

From a practical point of view, the current density has to be such that the individual anodes are not undergoing any undesirable changes during the course of oxide formation such as premature breakdown (field crystallization) of oxide film due to increased electrolyte concentration and excessive temperature. Since we are mostly dealing with porous anodes, we have to consider the effects of mass transport and heat transfer between the inner parts of the anode and the surrounding electrolyte. During the course of oxide formation, hydrogen ions are being generated at the tantalum oxide electrolyte interface which change the ion concentration locally. Formation electrolytes typically are low-conductivity electrolytes. Thus a second problem is how to obtain localized control of the electrolyte concentration.

Thirdly, the maximum formation voltage that can be reached in a given system depends, among other factors, on the electrolyte concentration. High formation rates applied to porous anodes lead to a lowering of the maximum formation voltage that can be reached without damaging the capacitor anode. How is this effected by the electrolyte concentration?

At a given current density the voltage increases linearly with time, as does the product I×V, the energy dissipated in the growing oxide film. The thermal energy must be removed by conduction through the tantalum anode and convection within the anode. The rate of heating is dependent on the current. Thus a fourth problem is how to prevent the electrolyte from overheating inside the anode as higher voltages are approached. For capacitors, a uniform, continuous, homogeneous oxide film is required. Normally, the oxide film formed on tantalum is amorphous and has the desired qualities.

However, under certain conditions a crystalline, heterogeneous oxide is formed which destroys the amorphous and uniform oxide. This happens to tantalum even under the most favorable conditions, e.g., flat geometry, low electrolyte concentration, and low temperature, as the oxide formation proceeds to high voltage. Depending on the variables given, this limiting voltage may be as high as 500 volts. Usually it is much less, and with porous pellets it may be as low as 200 volts. Whenever it is reached, it renders the oxide film useless for capacitors. It must, therefore, be avoided and the forming conditions must be set accordingly.

The high-voltage limit depends directly on concentration. Low electrolyte concentrations are chosen if higher voltages are to be reached.

High temperature can lead to boiling of the electrolyte with gas formation leading to electrical breakdown. Sites of breakdown can become centers of crystallization and thereby destroy the oxide film. The temperature must, therefore, be controlled at the site of oxidation formation.

The effects of high temperature and high concentration are superimposed in their effect on the crystallization of the oxide.

The oxide formation reaction leads to the generation of hydrogen ions at the anode, believed to be according to the following reactions:

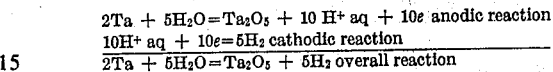

The concentration is, therefore, being changed in the immediate vicinity of the anode surface. The surface concentration depends on the current density and the mass transport situation. Stirring will minimize the effects of the concentration buildup.

Large amounts of hydrogen ions are generated inside a porous structure. Convection is largely eliminated as a means of equalizing the concentration. Diffusion and migration in the electric field of hydrogen ions are the major components of mass transport. A concentration gradient is set up inside the anode. The magnitude of this gradient depends, among others, on the current density. The higher the current the steeper the gradient and the higher the concentration in the center of the anode.

This means that inside the pellet the conditions for crystallization are most favorable and that current, temperature, porosity and size are determining factors in that they determine the magnitude of the gradient and the maximum concentration that is reached inside the anode.

It will be apparent from the foregoing that current density and electrolyte temperature are two parameters that should be controlled if the problems of formation at higher voltages and in large tantalum anodes are to be minimized.

A tank system for continuous formation clearly has shortcomings if this criterion is applied. The temperature is by necessity uniform in a single tank. The current density can be controlled by controlling the variables mentioned previously, but the current density profile over the full range of formation voltages to be used in the system is fixed by the geometry of the tank.

In general the following problems have been found to exist with continuous tank formation systems.

All charge required to form the oxide film over the whole tantalum surface immersed in the electrolyte has to be supplied through the common carrier strip and fed into the strip at the entrance to the formation tank. The resulting current depends on the formation rate, and the capacitor rating (CV/inch), to name the two most important factors. The current can become high as either one of these factors is increased. The cross section of the carrier strip is usually small and fixed because of the high cost of tantalum. The high current leads to a voltage drop along the tape which prevents proper formation to final voltage. Also, it leads to excessive heating of the carrier strip.

It is possible to alleviate some of these problems by providing for multiple contacts to the tape, for example, the tape can be brought above the electrolyte level and be contacted by a roller contact with knife edges to penetrate the oxide film. However, difficulties exist in making good contact to oxidized tantalum.

Also, there is a serious corrosion problem as all metal parts in contact with the tape are at a high positive potential with respect to the electrolyte. Therefore, any electrolyte creepage or condensation can create a very serious corrosion problem.

The formation rate of the anodes should preferably be controlled. In a tank system, current density as a function of the position in the tank is determined by:

a. The geometry of the tank, e.g., the position of the counterelectrode and the cross section of the electrolyte as a function of the distance from the point of entrance of the tape,
b. the conductivity of the electrolyte,
c. the rate at which tape is passed through the tank, i.e., the production rate,
d. the size of the anodes and the number of anodes per linear inch of tape, (CV/inch).

In a tank system, the conductivity of the electrolyte is the only parameter that can be changed easily to adapt the system to a change in production rate or CV/inch. The electrolyte cross section can be made adjustable within certain limits by providing a tank with variable geometry. This is an awkward situation as too many variables have to be balanced to obtain optimal formation conditions. A change in electrolyte conductivity, even though not too serious in the middle ranges of formation voltages, can become a serious problem because it affects the maximum voltage that an oxide film can be formed to.

For optimal results, the temperature of the electrolyte should be reduced at higher voltage levels as the energy dissipated in the oxide film increases.

The changeover from one capacitor rating to another is difficult in a tank system and a full tank load will be lost in most cases. A gradual changeover is not possible with this type of system. The same applies to the aging process in which the anodes are held to a final constant voltage for a given length of time.

SUMMARY OF THE INVENTION

In order to wholly or partially overcome the foregoing problems, the following process or portions thereof is utilized.

The description of the formation technique will be as applied to the anodic oxidation of powder on foil tape. Obviously, it is not limited to this configuration but can be applied to plain foil or to any system in which individual anodes or groups of anodes have been interconnected by means of a continuous tape or wire or the like, which can be made from the same material as the anodes or any other metal suitable for the given purpose.

Rather than applying the total formation voltage at once and limiting the current by means 0 the electrolyte conductivity, position of the counterelectrode, and geometry of the tank, in accordance with the present invention, the voltage is applied in small steps. Schematically, the formation process may be subdivided into a number of formations at constant voltage. In a stationary system, this would mean stepping up the voltage from 0 volts to formation voltage in increments sufficiently small to prevent excessive current overshoots. It is obvious that in the limiting case of infinitesimally small steps we approach a smooth increase in voltage with time. The formation rate is controlled by the rate of voltage increase. An approximately linear increase in voltage with time may be most desirable in some cases; other formation profiles may be desirable in others.

In the continuous anodization system, individual anodes are wound through a series of electrolyte jets which, by means of counterelectrodes in contact with the electrolyte, are maintained at increasingly higher potentials. As the anodes move from jet to jet, the oxide film grows to the potential of the particular jet. The anodization proceeds in steps, the voltage increment between steps being sufficiently small to yield a relatively smooth and steady increased in formation voltage.

THE DRAWINGS

FIG. 1a shows the voltage and current as a function of time for constant formation rate with constant current and FIG. 1b shows formation at constant voltage.

FIG. 1c shows the voltage and current as a function of time for the stepwise formation of a single anode. The voltage increases in increments $V_1$, $t$ being the time at a particular voltage. The current after a voltage change exhibits a peak $i_o$ and decreases exponentially thereafter.

FIG. 2 is a schematic view of one method of applying the stepwise voltage in accordance with the present invention.

FIG. 3 is a schematic top view of the method of applying the voltage shown in FIG. 2.

FIG. 4 is a view of the film-forming metal strip with anodes attached thereto.

DETAILED DESCRIPTION

Figure 1A:
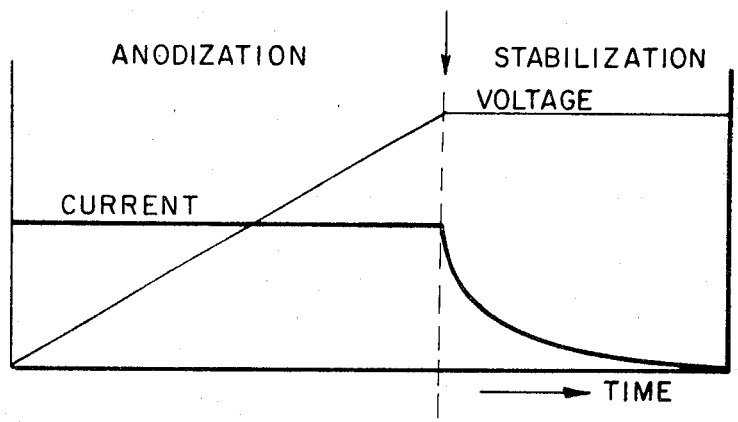

Rows of metal tubes 10 are mounted in a nonconductive block 11 as shown in FIG. 2. The spacing as 10A and 10B between adjacent tubes may be 0.100 to 0.250 inches for example 0.125 inch, the spacing between opposing needles may be 0.1 to 1 inch, for example 0.2 to 0.3 inch. A pan 12 is bolted to the Teflon block for collection of the electrolyte.

Opposing electrode tubes 10 are interconnected electrically. Each of the pairs is connected electrically to a series of power supplies whose output voltages increase in steps. For example, such power supplies may constitute transformers with rectifiers, with or without variable or fixed resistors. Battery power may be used if proper recharging facilities are provided. The positive terminal is preferably grounded at $G_1$. The tantalum strip should also be grounded as indicated at $G_2$.

The electrolyte is circulated through the electrode tubes as indicated by the arrows in FIG. 2. From a reservoir 14, which is equipped with means to thermostatically control the electrolyte temperature and maintain a predetermined conductivity of the electrolyte, the electrolyte is transferred by means of a pump 15 to the electrolyte distributor 16. This is a container with means for connecting tubing to its bottom. The distributor vessel is open and provided with an overflow 17 which is in communication with reservoir 14 to maintain a constant level. Individual lines 18A, 18B carrying electrolyte to individual electrode tubes are connected to the bottom of the distributor. The lines are made for example from polymeric spaghetti tubing, such as Teflon, polypropylene, etc.

The distributor vessel may be adjusted in height for control of the rate of electrolyte flow in the supply lines. The electrolyte lines should be sufficiently long for example 120 inches and of sufficiently small cross section (0.100-inch diameter) so as to keep their resistance high and prevent high currents between the various electrode tubes through the electrolyte system. All tanks and lines are preferably insulating.

If desired, both reservoir 14 and distributor 16 may be provided with grounds. For example, carbon or platinum electrodes 14E and/or 16E may be utilized for this purpose.

At this point, it should be emphasized that one aspect of the present invention involves an electrochemical processing system in which a continuous strip, tape, wire, with or without appendages, or sections of the same mounted on a suitable carrier fixture, including presently used processing fixtures, are moved through a series of electrolyte jets, fountains, waves, etc., which are polarized by means of suitable counter electrodes. In one form the counter electrode is the processed material itself i.e., when it is made the cathode in the case of alternating anodic and cathodic sections.

The present invention therefore includes applications such as anodic oxidations of valve metals for capacitor applications, but also includes treatment of nonfilm-forming metals, for example aluminum for strip conductors and including such ramifications as treating the edge portion of foil strip conductors, such as in U.S. Pat. No. 2,974,097. Other applications include electroplating, electrochemical etching and polishing. Thus, in general the present invention is applicable to any operation where an electrochemical reaction requires that the current density be controlled and apportioned properly in all sections of the material, and where the material is being moved in continuous or quasi-continuous fashion e.g., shorter sections mounted on a carrier.

By way of example, the following description will be directed to a film-forming metal strip having appendages to be anodized to form capacitors, but it will be apparent to those skilled in the art that the teachings have broad applications including for example the systems and applications given in the two preceding paragraphs.

The strip 19 may be supported for example by a frame 21 as it passes between parallel rows of electrode tubes 10 from which electrolyte jets emerge. Pairs of opposing electrodes are maintained at the same potential in order to insure uniform formation on both sides of the anodes 20.

As can be seen from FIG. 4, the anodes 20 are attached to the strip 19 by means of connector portion 22. The anodes 20 have previously been sintered in a manner known in the art. The film-forming strip 19 contains holes 23, which may be formed for example by stampings which are used to move the strip as can be seen from FIG. 3. For example, the anode and strip may be prepared as described in U.S. Pat. No. 3,412,444 assigned to the same assignee as the present application and which patent is hereby incorporated into the present application by reference.

As can be seen from FIG. 3, the strip 19 with the anode 20 affixed thereto is unwound from a reel 30 thereof. The spike 31 on wheel 34 engage the openings 23 in the strip to transport the strip through the operations shown in FIGS. 2 and 3. Similarly, spikes 33 on wheel 34 guide the strip onto windup wheel 35 after the formation operation has taken place.

As the strip moves through the anodizing apparatus shown in FIG. 3, it passes through a plurality of stations indicated as $S_1$, $S_2$ and $S_3$. Each of these stations is at a different voltage $V_1$, $V_2$ and $V_3$, etc. The number of such stations may vary as desired, and will generally be somewhere between 2 and 100. Within a given station, the voltage applied to the anodes 20 is the same. Within each station the electrolyte is supplied to the tubes 10 from whence it is applied to the anode 20. The voltage $V_2$ across the tubes 10 to the anode 20 is the same within a given section and is equal to $V_2$ in section 2, $V_1$ in section 1 and $V_3$ in section 3, etc.

Figure 1B:
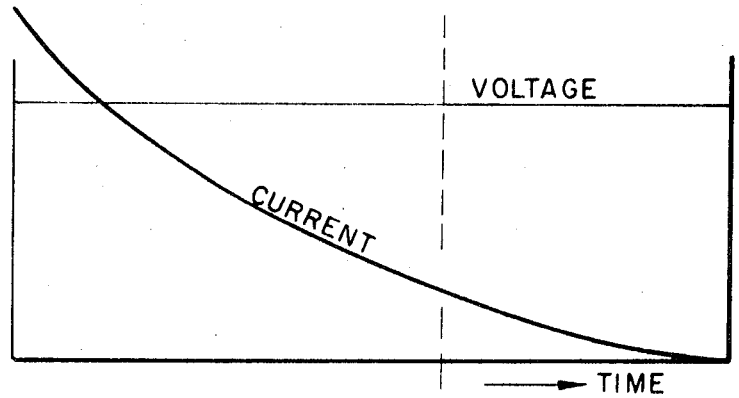

The resistance of the electrolyte jet between the mouth of the electrode tube and the anode side facing the tube determines the initial current peak (FIG. 1). This current overshoot can be adjusted by adjusting the distance of the tube from the anode.

In case of high conductivity, electrolytes such as phosphoric acid, with a conductivity of 0.10 ohm$^{-1}$ cm.$^{-1}$ or higher, it may be desirable to slip an insulating piece of tubing over the electrode tube in order to lengthen the electrolyte path thereby increasing its resistance and reducing the peak current.

It should be noted that in this process of continuous anodization of anode appendages only the anodes should become oxidized. The continuous carrier strip is preferably kept out of solution. Therefore, electrolyte creepage over the stem of the anodes is preferably substantially prevented. A nonwetting barrier, such as a layer of silicone rubber, or a Teflon sleeve may be used for this purpose (not shown). Also, the contact area between the tantalum strip and the fixture or frame is preferably kept substantially dry. This can be accomplished for example by heating the fixtures that hold the tantalum strip in place.

In general the electrolyte should have a conductivity of about 0.10 to 0.001 ohm$^{-1}$ cm.$^{-1}$ or a resistivity of about 10 to 1,000 ohms cm. Any electrolyte which having this resistivity it is believed will operate satisfactorily in the process of the present invention.

For example, electrolytes which may be used in accordance with the present invention is an acidic solution. For example, phosphoric acid, citric acid, oxalic acid, formic acid may be used. Other acids would work in some applications. Additionally, salts may be used such as alkali metal salts. For example, alkali metal sulfate salts, alkali metal phosphate salts and alkali metal oxalates, formates. Also, alkaline earth salts of these acids may also be used.

The rate of circulation of the electrolyte may vary widely. However, it is preferably about 50 to about 200 milliliters per minute per tube. For example, 60 to 100 milliliters per minute may be used. The electrolyte when being operated continuously should be replenished about once in 1 to 20 hours, preferably about every 7 to 13 hours.

The nonconductive block of the type shown at 11 in FIG. 2 may be made of any nonconductive material having sufficient rigidity to support the metallic tubes. Exemplary materials include polymeric materials such as polypropylene, polyethylene, tetrafluoroethylene, polyvinyl, chloride, as well as halogenated or nonhalogenated vinyl polymers.

The electrode tubes 10 may be made of a conductive material. Preferably they are made of metal. Exemplary materials include stainless steel, tantalum, titanium and platinum and alloys thereof. It is very important that the chambers 13a, 13b, 13c etc., be separate from one another so that the current will not flow for example from one chamber to the other rather than across the gap to the strip.

The voltage per chamber may vary widely. However, the voltage per chamber of from 1 to about 24 volts is a range which may be utilized. Preferably the volts per chamber is 3 to 7 volts.

The time in which the strip is in each chamber may also vary widely. However, it will generally be in the range of about 1 to 20 seconds, preferably 7 to 13 seconds per chamber.

Figure 1C:
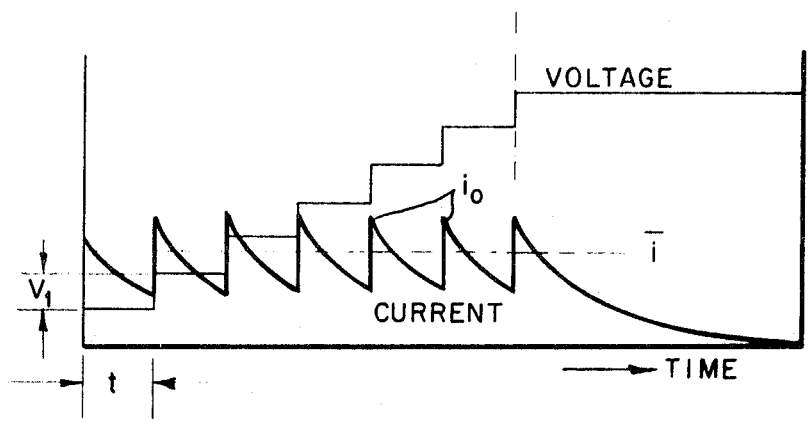

The current peaks in FIG. 1c may vary considerably; however, they are preferably no greater than about 2 amps.

In order to avoid the problem of current passing from $V_1$ to $V_2$ through the electrolyte, for example, electrodes may be utilized in the electrolyte reservoir and in the electrolyte distributor indicated at 14E and 16E respectively, for example, made of carbon or platinum. Utilization of these electrodes substantially maintains all electrodes acting as cathodes at repetitive potential vis a vis the tantalum strip and thereby suppressing anodic currents that would lead to corrosion of the electrode tubes.

In accordance with the method of anodization of the present invention, it is relatively easy to vary the voltage rating of capacitors resulting from the present invention. This can be done by making the last electrode pairs maintained at the highest voltage desired. For example, if $V_1$ through $V_7$ were respectively, 10, 20, 30, 40, 50, 60 and 70 volts and 50-volt anodes were desired, $V_5$ through $V_7$ would all be maintained at 50 volts. On the other hand, if a 70-volt device were desired, $V_5$ would be 50 volts, $V_6$ 60 volts, $V_7$ 70 volts. The principle applies all the way up to as high a voltage as desired and obviously the difference of 10 volts is taken as merely exemplary.

It is thus apparent in accordance with the present invention that it is easy to change from one rating to another by merely switching in the power supply in contrast to hereinbefore-mentioned problems of a tank system.

The number of voltage steps and their magnitude can be selected to fit process requirements. This means that the formation profile can be programmed externally and modified by simply changing electrical connections. No adjustments have to be made in the anodizing equipment itself or in the electrolyte conductivity if any one of the process parameters such as, for example in making capacitors CV/inch, final formation voltage, or production rate, change.

Additionally, changeover from one rating to another is simplified since the anodization program can be changed continuously as the strip moves through the system. Little material is lost since only a few inches between steps are lost during the changeover.

Formation to voltage and stabilization at voltage become operations which require the same equipment. This results in a unified design concept for formation, stabilization and reformation.

Finally, continuous formation system of the present invention is well suited for automatic control of the anodization process since the voltage profile can be programmed externally and since only electrical connections are required to make changes.

EXAMPLE I

A 1-foot piece of strip 19 welded to a supporting frame 21 with the frame mounted on a movable carriage (not shown) is anodized by moving the tantalum strip at a predetermined rate through the row of electrolyte jets maintained at increasing voltages.

The following table summarizes the operating parameters.

| | |
|---|---|
| Number of voltage steps: (electrode tubes) | 30 per foot |
| Distance between electrodes: | 0.400 in. |
| Diameter of electrode tubes: (gauge 11) | 0.120 in. O.D. |
| Distance between opposing electrodes: | 0.500 in., approximately |
| Size of Teflon spaghetti tubing: AWG 9 | 0.119 in. I.D. nominal |
| Length of spaghetti tubing: | 24 in., approximately |
| Flow rate of electrolyte: | 100 ml./min. per tube |
| Temperature of electrolyte: | 85° C. |
| Conductivity of electrolyte (dilute $H_3PO_4$) | 100 ohm-cm. |
| Size of voltage steps: | 6 volts |
| Time per voltage step: | 10 sec. |
| Formation rate: | 36 volts/min. |
| CV rating: | 100 $\mu$f. volts |
| Final formation voltage: | 150 volts |

The capacitance of the resulting anodes was found to be about 0.68 $\mu$f. with about ±5 percent variation from anode to anode.

EXAMPLE II

The specifications for a continuous system utilizing the system shown in FIGS. 2 and 3 is as follows:

| | |
|---|---|
| Production rate: | 3,600 units per hour = 1 ft. per min. |
| CV rating: | 150 $\mu$f. volt |
| Formation rate: | 30 volts/min., max. |
| Current requirement (per anode at max. rate) | 0.5 $\mu$a./$\mu$f.-v. = 50 ma./anode |
| Voltage step height: | 5 volts |
| Tape length per voltage step: | 2 inches |
| Time per step: | 10 sec. |
| Spacing of electrodes within step: | 0.100 in. |
| Spacing between steps: | 0.200 in. |
| Electrolyte: Dilute $H_3PO_4$ | 100 ohm-cm. |
| Temperature: | 85° C. |
| Electrolyte replenishing cycle: | 12 hours |
| Flow rate per electrode: | 100 ml./min. |
| Formation voltage: | 300 volts |

Anodes formed in this system exhibited a capacitance of about 0.5 $\mu$f. and capacitance variation from anode to anode was within ±5 percent as was desired.

I claim:

1. A method of continuously forming an anodized film-forming metal oxide coating comprising:
continuously passing the film-forming metal to be anodized through a plurality of stations; applying an electrolyte having resistivity of about 10 to about 1,000 ohms cm. to the film-forming metal to be anodized through electrode jets at each of said stations; the electrolyte potential of said jets at successive stations increasing in voltage increments of about 1 to about 24 volts in order to continuously produce anodized metal of desired electrical potential.

2. A method according to claim 1, wherein a plurality of electrode jets are provided at each station and wherein the electrode jets at each station are maintained at substantially the same electrical potential.

3. A method according to claim 1 in which the time at each station in which the anodes are in contact with the electrolyte is from about 1 to about 20 seconds.

4. A method according to claim 1 in which the electrolyte is an acid solution.

5. A method according to claim 1 in which the acid solution is selected from the group consisting of phosphoric acid, citric acid, oxalic acid, formic acid and mixtures and salts thereof.

6. A method according to claim 1 in which the metal to be anodized is connected to a strip.

7. A method according to claim 6 in which the strip carries a plurality of anodes from station to station.

8. A method according to claim 1 in which the voltage increment from station to about is about 3 to 7 volts.

9. A method according to claim 1 in which the time at each chamber in which the film-forming metal being anodized is in contact with the electrolyte is from about 7 to 13 seconds.

* * * * *